United States Patent
Stanton et al.

(10) Patent No.: US 6,350,048 B1
(45) Date of Patent: Feb. 26, 2002

(54) PASSENGER LIGHTING SYSTEM FOR MASS TRANSIT VEHICLE

(76) Inventors: William H. Stanton, 5-390 Wellington Crescent, Winnipeg, Manitoba (CA), R3M 0B7; Paul A. Wasney, 160 Wexford Street, Winnipeg, Manitoba (CA), R3R 0R7

( * ) Notice: Subject to any disclaimer, the term of this patent is extended or adjusted under 35 U.S.C. 154(b) by 0 days.

(21) Appl. No.: 09/497,634

(22) Filed: Feb. 3, 2000

(51) Int. Cl.$^7$ ................................................. B60Q 3/02
(52) U.S. Cl. ........................ 362/478; 362/479; 362/480
(58) Field of Search ................................ 362/478, 479, 362/454, 217, 260, 362, 223, 224, 225, 219

(56) References Cited

U.S. PATENT DOCUMENTS

| | | | |
|---|---|---|---|
| 2,262,157 A | 11/1941 | Beals | |
| 2,587,807 A | * 3/1952 | Arenberg | 362/479 |
| 3,210,875 A | * 10/1965 | Schwenkler | 40/589 |
| 3,233,096 A | 2/1966 | Schmitt | |
| 3,363,093 A | 1/1968 | Schmitt | |
| 3,748,460 A | 7/1973 | Price | |
| 3,829,677 A | 8/1974 | DeLlano | |
| 4,344,111 A | 8/1982 | Ruud et al. | |
| 4,574,336 A | 3/1986 | Mikalonis | 362/479 |
| 4,625,267 A | 11/1986 | Mikalonis | 362/150 |
| 5,006,966 A | 4/1991 | Mikalonis | 362/483 |
| 5,113,322 A | 5/1992 | Mikalonis | 362/479 |
| 4,387,415 C1 | 12/1992 | Domas | 362/479 |
| 5,394,317 A | 2/1995 | Grenga et al. | |
| 5,441,326 A | 8/1995 | Mikalonis | 362/208 |
| 5,558,425 A | * 9/1996 | Pons | 326/490 |
| 5,678,914 A | 10/1997 | Dealey et al. | 362/551 |
| 5,693,921 A | * 12/1997 | Miller | 200/5 A |
| 5,752,760 A | 5/1998 | Dealey, Jr. et al. | 362/551 |
| 5,857,758 A | 1/1999 | Dealey, Jr. et al. | 362/551 |
| 5,860,723 A | 1/1999 | Domas et al. | 362/346 |
| 6,082,879 A | * 7/2000 | Myburgh | 362/480 |
| 6,092,913 A | 7/2000 | Edwards, Jr. | |

* cited by examiner

Primary Examiner—Alan Cariaso
Assistant Examiner—Hargobind S. Sawhney
(74) Attorney, Agent, or Firm—Murray E. Thrift (57) ABSTRACT

A public transit vehicle has a vehicle body having a roof defining an interior ceiling surface, two side walls each extending longitudinally of the vehicle including an upper side wall portion connecting to the roof and a row of windows underneath the upper portion, a central aisle and two rows of seats each on a respective side of the aisle and along the side wall at the windows and a lighting fixture supported in the vehicle along the ceiling surface longitudinally of the vehicle at a position above each row of seats. Below the lighting fixture is provided an elongate advertising card support panel member for receiving and supporting an advertising card. The housing is substantially continuous along the vehicle and supports a plurality of fluorescent tubes mounted in the light housing. Between each tube and the next is provided a web member having an inner surface matching that of the housing and an outer surface butting edges of the individual lens/covers mounted on the light housing. The card support panel member carries adjacent the bottom receptacle thereof an elongate pressure switch strip operable at any point along its length for signalling the driver. The reflector is mainly parabolic with a V-shaped center section acting as a beam splitter and a support for a ground wire. The lens includes two upstanding fins each on a respective side of the tube and each carrying a reflective layer to restrict light from passing toward the aisle and the windows.

20 Claims, 6 Drawing Sheets

PASSENGER LIGHTING SYSTEM FOR MASS TRANSIT VEHICLE

This invention relates to lighting system for a passenger area of a mass transit vehicle.

This application is related to a series of four further applications all filed simultaneously with this application and assigned to the same assignee as follows:

application Ser. No. 09/496,686 filed Feb. 3, 2000 and entitled Interior Structure of a Mass Transit Vehicle;

application Ser. No. 09/497,633 filed Feb. 3, 2000 and entitled Side Impact Structure for Mass Transit Vehicle;

application Ser. No. 09/496,684 filed Feb. 3, 2000 and entitled Body Structure of Mass Transit Vehicle;

application Ser. No. 09/496,685 filed Feb. 3, 2000 and entitled Window Structure for Mass Transit Vehicle.

The disclosures of the above applications are incorporated herein by reference.

BACKGROUND OF THE INVENTION

Public transit vehicles particularly buses also including subway carriages generally provide a row of seats along each side of the vehicle and an aisle centrally of the vehicle. A lighting strip is positioned above the row of seats and generally there is an inclined advertising card receiving panel extending from the outside edge of the lighting downwardly toward the window. In many cases the lighting co-operates with or defines ductwork so as to communicate air conditioning to outlets adjacent to the top edge of the window for discharging downwardly onto the passengers in the row of seating.

It is generally accepted that the internal lighting in transit vehicles should provide the following features:
1. Deliver 15 foot candles of illumination to a 1 square foot plane at an angle of 45, centered 33 inches above the floor and 24 inches in front of the seat back at each seating position (sufficient for a seated passenger reading).
2. Illuminate the aisles, delivering no less than 10 foot candles.
3. Illuminate advertising displayed in the ad frames (which are usually associated with the lights or are lighted from behind, forming part of the lighting system).
4. Reduce or eliminate reflections of the light elements in the side windows which interfere with the passengers view of street signs and the like.

Transmatic Inc. of Michigan, U.S.A., is the leader in transit lighting systems and has over the years provided a number of different arrangements. Transmatic has recently introduced its new L20 Luminator lighting system. This system consists of a pultruded, crescent-shaped profile which forms the ad frame (into which slide the advertising placards) and also the support system for T12 fluorescent tubes, ballast, wiring, lens, and ventilator grilles, as well as forming the front wall of the heating and cooling system of the bus. The profile is connected along its top edge to the bus structure by means of a riveted, continuous hinge; captive fasteners along its bottom edge hold the profile in place. The entire assembly swings out for access to electrical components located in the space behind the lighting profile.

Transmatic hold the following patents:

U.S. Pat. No. 4.387,415—discloses a lighting system generally as described above including a unitized system formed from pultruded parts manufactured from fibre reinforced plastics material which defined the light housing and the advertising card support panel.

U.S. Pat. No. 4,574,336—discloses a similar system with a pivotal covering lens.

U.S. Pat. No. 4,625,267—discloses a central lighting system for a central ceiling area.

U.S. Pat. No. 5,006,966—discloses a lamp housing with a series of incandescent lights and an optical strip arranged in the housing alongside the incandescent lights for absorbing and re-transmitting the light in a diffused manner.

U.S. Pat. No. 5,113,322—is closely related to the above patent but discloses the further embodiment with a modified lamp housing and lens.

U.S. Pat. No. 5,678,914—discloses an illumination system for the cargo space of a truck box and provides a strip light in a corner of the truck box.

U.S. Pat. No. 5,441,326—discloses a lamp arrangement for use with a luggage rack.

U.S. Pat. No. 5,752,760—discloses an arrangement in which the lamp housing is moved from the normal position at the top of the advertisement card display panel to a position adjacent the lower edge of the panel at its junction with the window. This arrangement is manufactured and sold by Transmatic as the L20 system and constitutes their current system as of the present date.

U.S. Pat. No. 5,860,723—discloses a light engine, that is a light source for a light pipe for use in a vehicle lighting system.

U.S. Pat. No. 5,857,758—discloses an arrangement substantially identical to that shown in U.S. Pat. No. 5,752,760 above.

A further feature which is necessary in transit vehicles is that of a signalling switch for actuation by the passenger to advise the driver of a desire to alight. In many cases the signalling switch is in the form of a cord dangled across the windows but more recent systems include a plurality of push buttons. Continuous strip switches are also known however these are not generally located in a suitable manner in conjunction with the lighting.

SUMMARY OF THE INVENTION

It is one object of the present invention, therefore, to provide an improved lighting system for a public transit vehicle.

According to a first aspect of the invention there is provided a public transit vehicle comprising:

a vehicle body having a roof defining an interior ceiling surface, two side walls each extending longitudinally of the vehicle including an upper side wall portion connecting to the roof and a row of windows underneath the upper portion, a central aisle and two rows of seats each on a respective side of the aisle and along the side wall at the windows;

and a lighting fixture comprising:

an elongate light housing supported in the vehicle along the ceiling surface longitudinally of the vehicle at a position above one of the rows of seats;

elongate light emitting elements mounted in the light housing and extending longitudinally of the housing;

a covering lens mounted on the light housing underneath the light emitting elements for enclosing the light emitting elements;

wherein the light housing defines a reflector surface which has a main body portion which is parabolic in cross-section defining a parabola axis longitudinal of the lens and located above the light emitting elements and wherein the light emitting elements have an axis thereof located substantially at the parabola axis such that light emitted thereby toward the main body of the reflector surface is reflected downwardly through the lens.

Preferably the lens has first portions thereof which allow passage of the light therethrough and portions which are reflective to restrict passage of light therethrough to increase the amount of light passing through the first portions.

Preferably there is provided an elongate advertising card support panel member supported in the vehicle body longitudinally of the vehicle at a position above the row of seats and having an upper edge adjacent to the light housing and inclined therefrom downwardly and toward an upper edge of the row of windows.

Preferably the lens includes a generally flat substantially horizontal main body portion and an inclined portion which is inclined upwardly and outwardly along one edge adjacent the support panel for allowing light to fall onto the support panel.

Preferably the opaque portions extend longitudinally of the lens and are arranged to restrict the passage of light directly from the light emitting elements toward the window and toward the aisle.

Preferably the lens carries at least one upwardly projecting longitudinally extending fin on which is provided an opaque portion of the lens.

Preferably the lens comprises a substantially horizontal portion which carries on an upper surface thereof two upwardly projecting longitudinally extending fins each on a respective side of the light emitting elements on each of which is provided an opaque portion of the lens and each of which is located between the light emitting elements and a respective one of the window and the aisle, the horizontal portion of the lens on either side of the fins and between the fins being arranged to allow the passage of reflected light from the reflector.

Preferably one of the fins lying on the side adjacent the aisle is higher than that adjacent the window.

Preferably the reflective portion extends from the respective fin partly onto the main body portion.

Preferably the lens includes an integrally molded cylindrical hinge portion along one longitudinal edge which hinge portion is received in a cylindrical receptacle for rotation therein.

Preferably an opposed longitudinal edge includes an upturned flange portion fastened to a flange portion of the housing by a plurality of spaced fasteners.

Preferably wherein the housing comprises a substantially longitudinally continuous channel defining the reflector for a plurality of the lighting elements, wherein each lighting element comprises a tube having electrical connectors at each end, wherein between each tube and the next is provided a web member having two sides lying in a plane at right angles to the axis and having an inner edge at right angles to the sides abutting a lower surface of the housing and an outer edge at right angles to the sides abutting an upper surface of the cover.

Preferably the cover is divided into separate portions each having a length corresponding to that of a respective one of the tubes and the cover members have end portions thereof with the upper surface of the end portions lying in contact with the outer edge of respective ones of the web members.

Preferably the reflector includes a V-shaped portion extending longitudinally thereof substantially at a center thereof above the light elements with an apex of the V-shaped portion projecting downwardly toward the element and two sides of the V-shaped portion diverging outwardly and connecting with the main body portion.

Preferably the sides merge contiguously with the main body portion.

When the reflector is non-conductive the V-shaped portion preferably carries at the apex a ground wire for the lighting element.

According to a second aspect of the invention there is provided a public transit vehicle comprising:

a vehicle body having a roof defining an interior ceiling surface, two side walls each extending longitudinally of the vehicle including an upper side wall portion connecting to the roof and a row of windows underneath the upper portion, a central aisle and two rows of seats each on a respective side of the aisle and along the side wall at the windows;

and a lighting fixture comprising:

an elongate light housing supported in the vehicle along the ceiling surface longitudinally of the vehicle at a position above one of the rows of seats;

elongate light emitting elements mounted in the light housing and extending longitudinally of the housing;

a covering lens mounted on the light housing underneath the light emitting elements for enclosing the light emitting elements;

wherein the light housing defines a reflector surface which has a main body portion;

wherein the housing comprises a substantially longitudinally continuous channel defining the reflector for a plurality of the lighting elements;

wherein each lighting element comprises a tube having electrical connectors at each end;

and wherein between each tube and the next is provided a web member lying in a plane at right angles to the axis and having an inner edge abutting the housing and an outer edge abutting the cover.

According to a third aspect of the invention there is provided a public transit vehicle comprising:

a vehicle body having a roof defining an interior ceiling surface, two side walls each extending longitudinally of the vehicle including an upper side wall portion connecting to the roof and a row of windows underneath the upper portion, a central aisle and two rows of seats each on a respective side of the aisle and along the side wall at the windows;

and a lighting fixture comprising:

an elongate light housing supported in the vehicle along the ceiling surface longitudinally of the vehicle at a position above one of the rows of seats;

elongate light emitting elements mounted in the light housing and extending longitudinally of the housing;

a covering lens mounted on the light housing underneath the light emitting elements for enclosing the light emitting elements;

wherein the light housing defines a reflector surface which has a main body portion;

and wherein the reflector includes a V-shaped portion extending longitudinally thereof substantially at a center thereof above the light elements with an apex of the V-shaped portion projecting downwardly toward the element and two sides of the V-shaped portion diverging outwardly and connecting with the main body portion According to a fourth aspect of the invention there is provided a public transit vehicle comprising:

a vehicle body having a roof defining an interior ceiling surface, two side walls each extending longitudinally of the vehicle including an upper side wall portion connecting to the roof and a row of windows underneath the upper portion, a central aisle and two rows of seats each on a respective side of the aisle and along the side wall at the windows;

and a lighting fixture comprising:

an elongate light housing supported in the vehicle along the ceiling surface longitudinally of the vehicle at a position above the row of seats;

an elongate advertising card support panel member supported in the vehicle longitudinally of the vehicle at a position above the row of seats and having an upper edge adjacent to the light housing and inclined therefrom downwardly and toward an upper edge of the row of windows and having upper and lower receptacles for receiving and supporting an advertising card;

a plurality of light emitting elements mounted in the light housing;

a covering lens mounted on the light housing underneath the light emitting elements for enclosing the light emitting elements;

the card support panel member carrying adjacent the bottom receptacle thereof an elongate pressure switch strip operable at any point along its length for signalling the driver.

Preferably the card support panel includes a surface underneath the strip and extending therefrom toward the window such that the strip is supported by the support panel at a position spaced away from the window.

BRIEF DESCRIPTION OF THE DRAWINGS

One embodiment of the invention will now be described in conjunction with the accompanying drawings in which.

DETAILED DESCRIPTION

Figure 1:
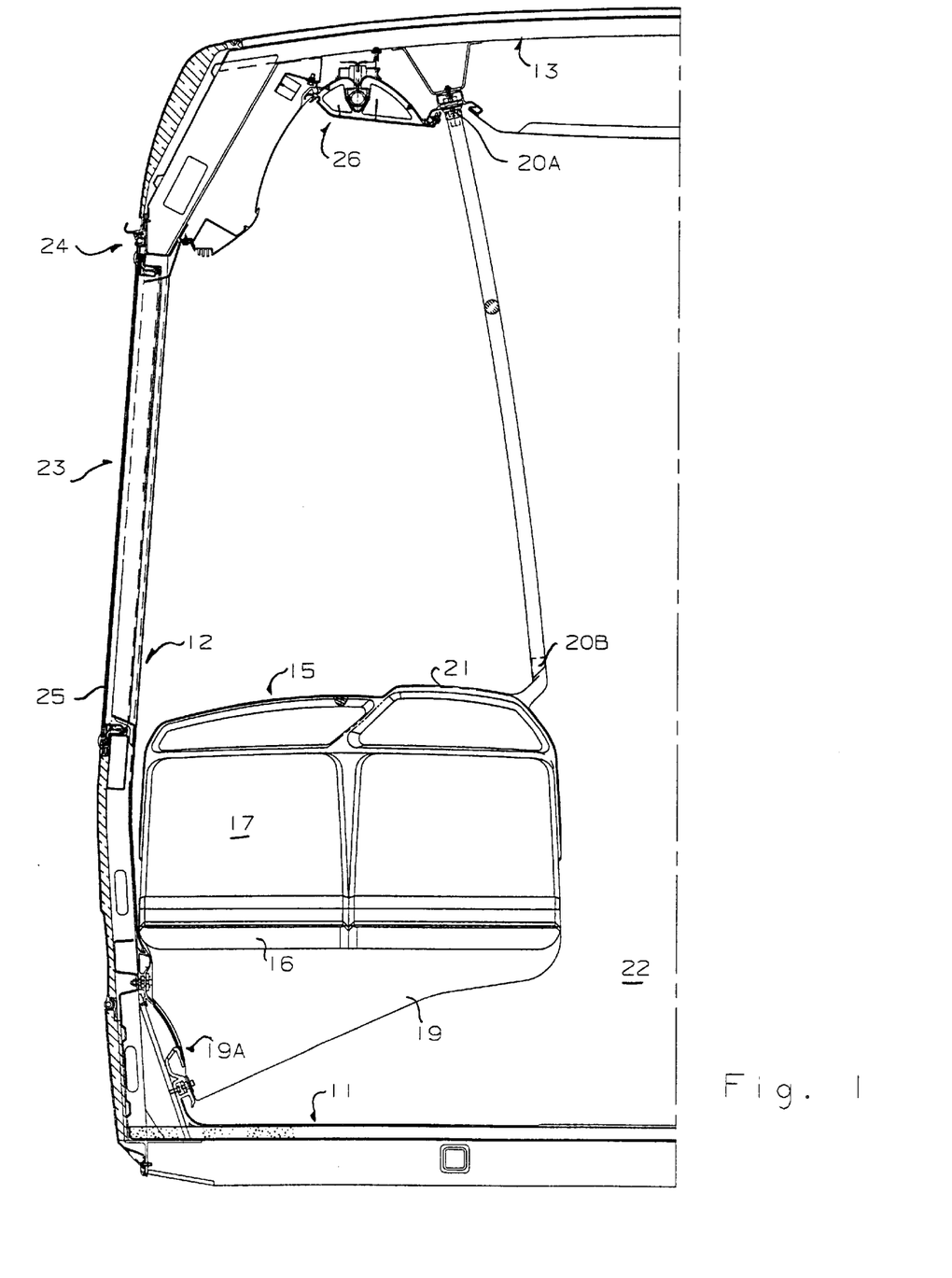
FIG. 1 is a vertical cross sectional view through one half of a public transit vehicle according to the present invention.
Figure 2:
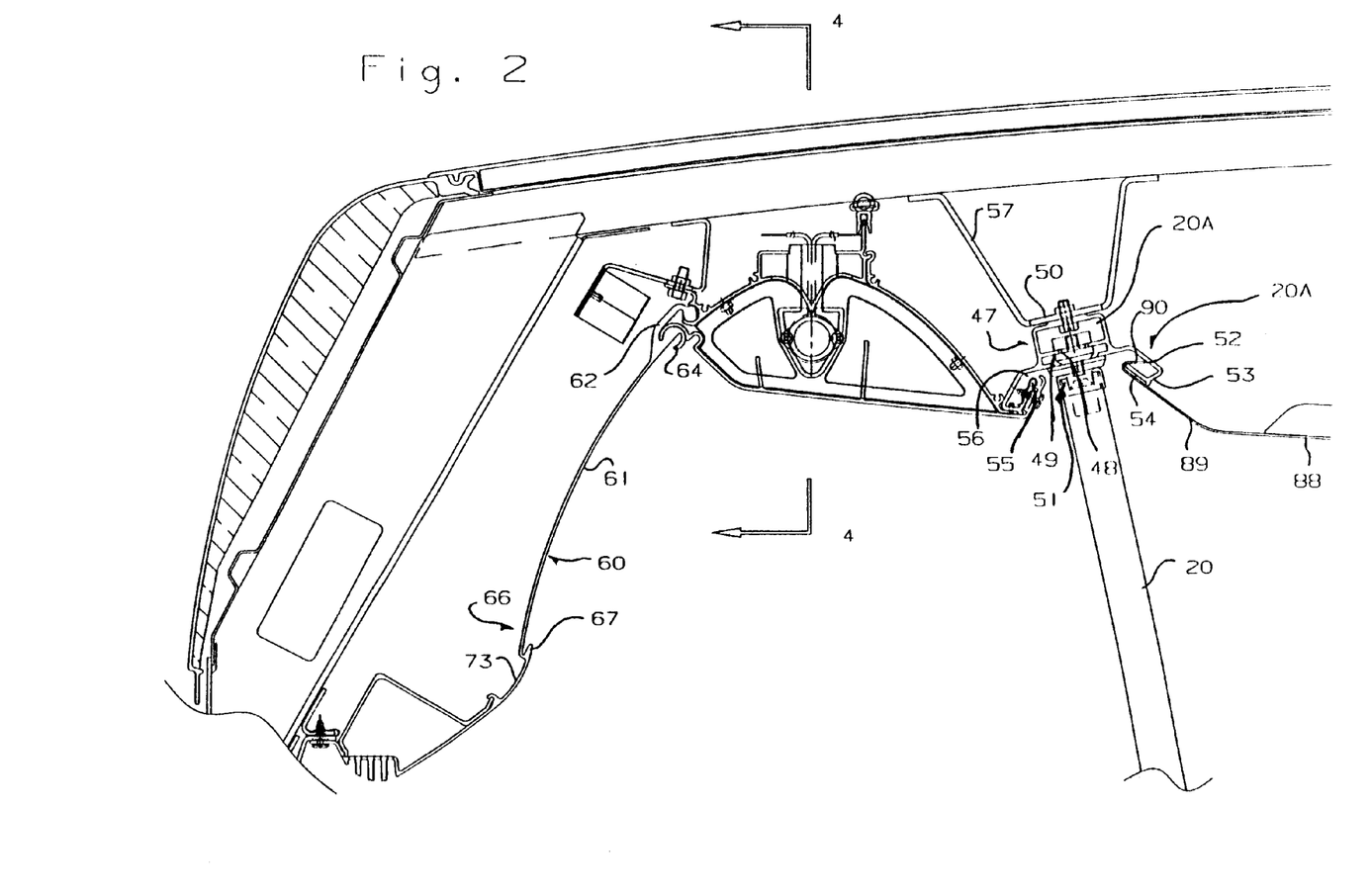
FIG. 2 is the same vertical cross sectional view as that of FIG. 1 on an enlarged scale and showing the lighting area only.
Figure 3:
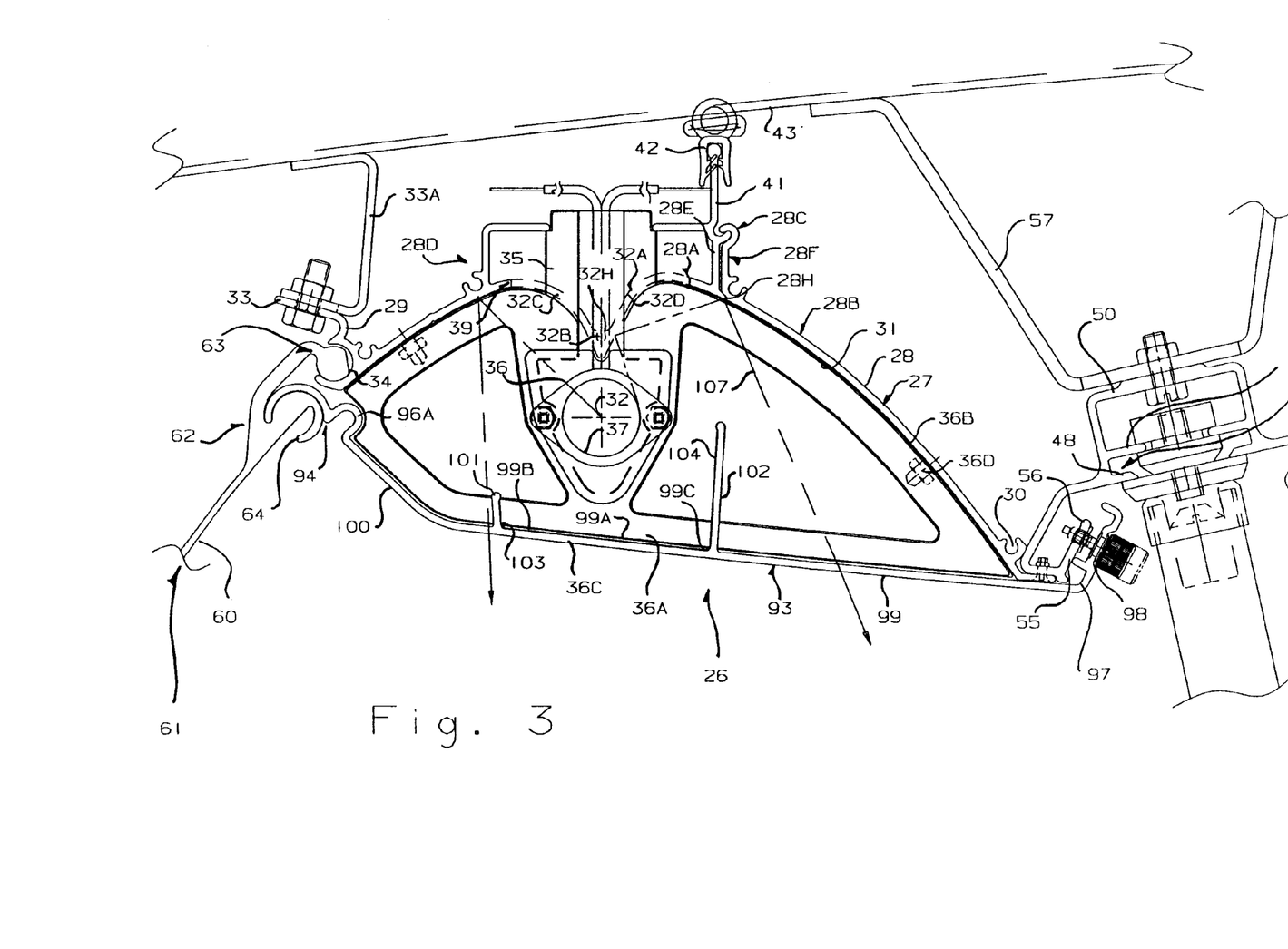
FIG. 3 is a similar vertical cross sectional view to that of FIG. 1 on an enlarged scale and showing the lighting area only.
Figure 4:
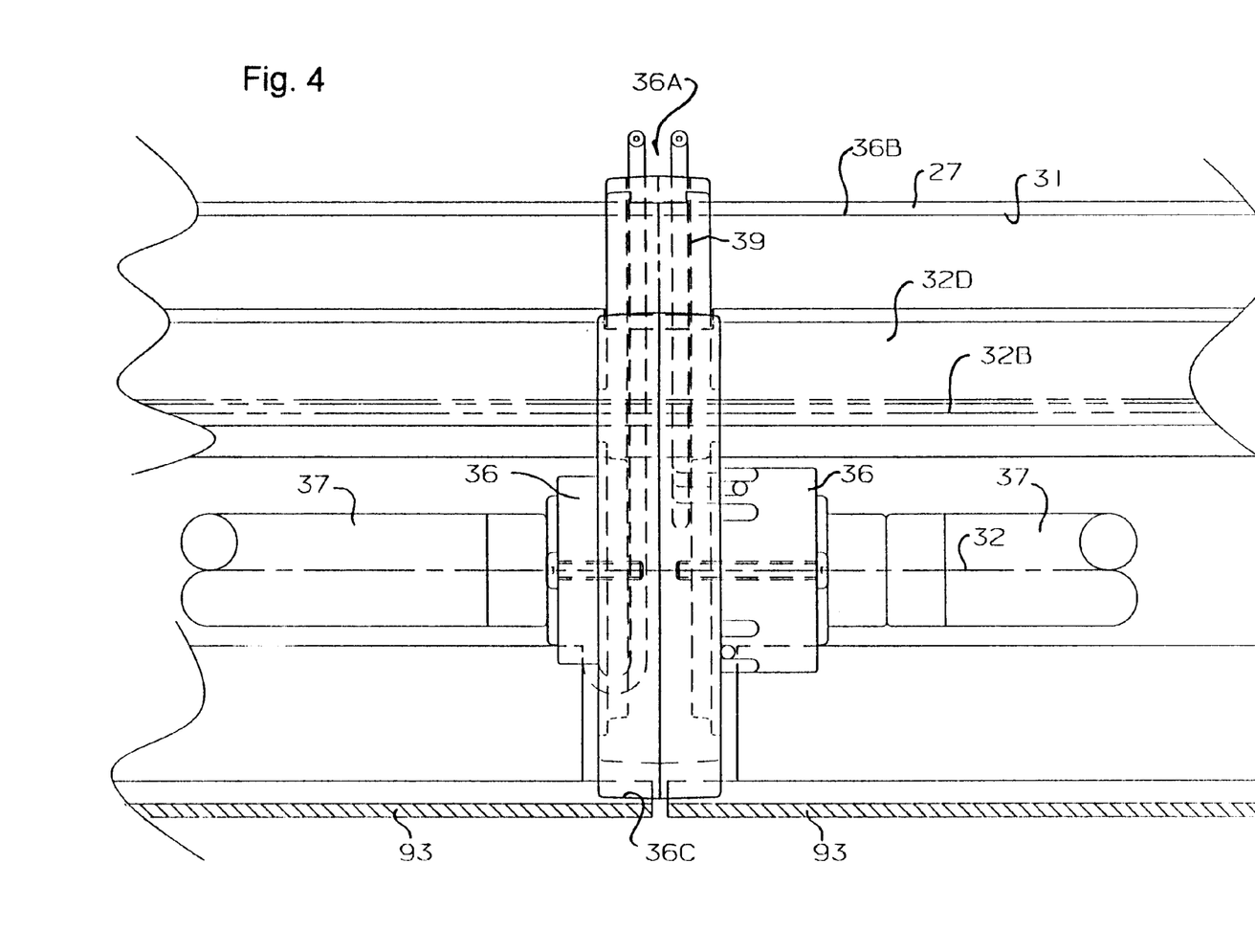
FIG. 4 is a cross sectional view taken on the lines 4—4 of FIG. 2.

A transit vehicle is shown in vertical cross section in FIGS. 1, 2 and 3 and in horizontal cross section in FIG. 4. The only elements shown of the vehicle are those necessary to illustrate the present invention so that other elements such as the engine, transmission, wheels and suspension are omitted since these will vary widely and are well known to one skilled in the art.

The transit vehicle 10 comprises a floor structure 11, a side wall 12 and a roof assembly 13 all of which include suitable panels and structural frame members which form the assembly into a rigid structure for mounting on suitable suspension. The details of the frame structure and the panels is not the subject of this invention and therefore will not be described in detail. Again these will be well known to one skilled in the art.

The floor structure 11 includes a portion 14 underlying a row of passenger seats 15.

In the embodiment shown the row of passenger seats is arranged in pairs of seats all facing forwardly while alternative arrangements for the seating can be used including seats facing rearwardly and seats at the side facing inwardly onto the aisle. In many cases a combination of such seats is used in the row of seats.

In the embodiment shown, the pair of seats includes a seat bottom 16 and seat back 17 which is formed into a rigid structural unit. One side of the seat is supported on a triangular cantilever 19 attached to the wall 12 just above an inclined panel portion 18 of the side wall. The cantilever 19 extends to an end 19A at the outer side of the seat.

Hand grasping generally upright stanchions 20 extend from a bracket 20A at the ceiling. At least some of the seats include generally horizontal hand rail sections 21 for grasping by the passenger in seating or rising and these are connected to respective ones of the stanchions at a vertical collar 20B to allow the passenger to move the hand to the stanchion to assist further in rising and moving along an alleyway generally indicated at 22. Others of the stanchions (not shown) are free standing and extend to a bracket at the floor The side wall 12 includes a window 23 extending from an upper header 24 to a bottom sill 25.

The lighting, advertising display, ducting and switching assembly for the vehicle is generally indicated at 26. This comprises a lamp housing 27 the details of which are best shown in FIG. 3. The lamp housing is extruded from a suitable metal such as aluminum so as to provide the necessary reflective properties, to provide a ground plane to facilitate lamp starting and so as to provide structural strength to support itself and its components without vibrating or bending.

The lamp housing 27 includes a generally parabolic reflector 28 extending from an outer end 29 adjacent to the window to an inner end 30 adjacent the aisle. The reflector is formed from two portions 28A and 28B which are joined at a coupling 28C. The portion 28A includes a pair of rearwardly and inwardly extending integrally formed rails 28D and 28E on the rear surface arranged to carry longitudinally spaced brackets 35 which support the sockets 36 for the fluorescent lamps 37. The rail 28E attaches to a rail 28F on the portion 28B at the coupling 28C by an interconnecting hook section and by a flange portion 28H at the bottom of the rail 28E.

The fluorescent tubes 37 are arranged end to end, each having end fittings engaging into the sockets 36 at the axis 32. At the junction between two tubes is provided a generally planar web member 36A lying in a plane at right angles to the axis 32 and which is shaped with a top edge 36B following the shape of the reflector and abutting the lower surface thereof. A lower edge 36C opposite to the top edge and at right angles to the sides follows the shape of the lens 93 described hereinafter and abuts the upper surface of the lens. The lens is divided into panel portions of the same length as the tubes so that the upper surface of end portions of the lens panels abut onto the edge 36C of the web member 36A. At the web member 36A, in order for the longitudinally spaced brackets 36 to project into the interior of the parabolic reflector portion 27, each is associated with a square hole 39 which is cut at the back of the reflector. The web member is fastened in place in the reflector by screws 36D.

The reflector portion 28 defines a downwardly facing reflective parabolic surface 31 defining axis of the parabola at 32. The parabolic surface is divided along its vertical plane containing the axis 32 by a V-shaped profile 32A the apex 32B of which projects toward the axis 32 to a position close to the axis but spaced from the axis sufficiently to leave room for the fluorescent tube. Thus the apex 32B extends toward the focal point of the parabola. On each side of the apex, the surface 32C and 32D follows a V-shape defining sides joining smoothly or contiguously with the remaining surface of the parabola on either side of the V-shaped projection 32A. The V-shaped projection forms a beam splitter which is located at the apogee of the parabola and is bracketed by two large fillets or radii. The apex of the V-shape is thus centered over the axial center of the tube and it thus acts to divide light emitting vertically from the center and upper surface of the tube so that the light is not reflected by the otherwise parabolic surface of the reflector back into the tube. This reduces heat build up in the tube which otherwise would occur and substantially reduce the life of the tube.

In an arrangement where the reflector is formed of aluminum or other conductive material, the reflector itself acts as a ground for the tube thus acting to assist in starting of the tube. In an alternative arrangement where the reflector is formed by pultrusion from fiber reinforced plastics material and is thus not conductive, the outer surface of the apex 32B defines a cylindrical surface which receives a ground wire 32H of the lighting system. The shape of the V-shaped projection locates the ground wire or the conductive body of the reflector within a distance of the order of 0.5 inches from the exterior of the tube and this distance is known to provide improved starting characteristics for the tube which reduces the voltage required at start up and thus prolongs the life of the tube.

At the outer edge 29 is provided a horizontal flange portion 33 which extends outwardly toward the window. A cylindrical receptacle 34 is provided at the junction between the flange 33 and the edge 29.

The inside rail 28E is attached to a fin 41 which extends vertically upwardly from that profile which is attached to a bulb seal 42 pressing against a roof bow 43. The fin is extruded with the lamp housing and therefore extends along the full length of the lamp housing and attaches into the bulb seal 42 which seals against the ceiling panel thus acting to divide the space between the ceiling and the lamp housing into a duct for conditioned or heated air. The flange 33 attaches to a structural member 33A carried on the roof bow 43.

At the inner edge 30 is attached a receptacle portion 47 for the top of the stanchion 20. Thus the receptacle portion 47 extends inwardly from the inner edge 30 and defines a series of generally horizontal plates 48, 49 and 50 which attach to a coupling 51 at the top of the stanchion 20. The plates converge into an outer portion 52 which forms a U-shaped loop with a downwardly extending nose 53 and an upturned and inwardly turned flange portion 54.

Also at the inner edge 30 is defined a flange portion 55 matching the flange portion 52 and extending upwardly and inwardly to define an upper edge 56. Thus the flange portion 52 and the flange portion 55 form a generally symmetrical receptacle area or channel into which the upper end of the stanchions 20 project to form an attractive appearance. The back plate 50 is connected by a bracket 57 to the roof bow 43.

The structure 26 further includes a second member generally indicated at 60. This is best shown in FIG. 2 and includes an advertising card support panel 61 connected at its upper end 62 to the receptacle 34. Thus the upper end 62 has a cylindrical rib portion 63 which engages into and is directly attached to the receptacle 34 for rotation therein. At the upper end 62 is provided a downturned lip 64 forming a receptacle for the upper edge of an advertising card (not shown).

The panel 61 includes at a lower end 66 an upturned lip 67 to receive the bottom edge of the card (not shown). The panel 61 is curved so as to form a downwardly and inwardly concave surface so that the card when inserted into the lips 64 and 67 is pressed against the surface of the panel 61 and thus similarly concave.

Beneath the lip 67 is provided a convex surface 73 providing an attractive elongate band. From the surface 73, the member 60 includes a wall portion extending outwardly toward the window for connection to the wall structure above the window thus supporting the surface 73 and the switch band spaced inwardly from the wall at the window.

Figure 6:
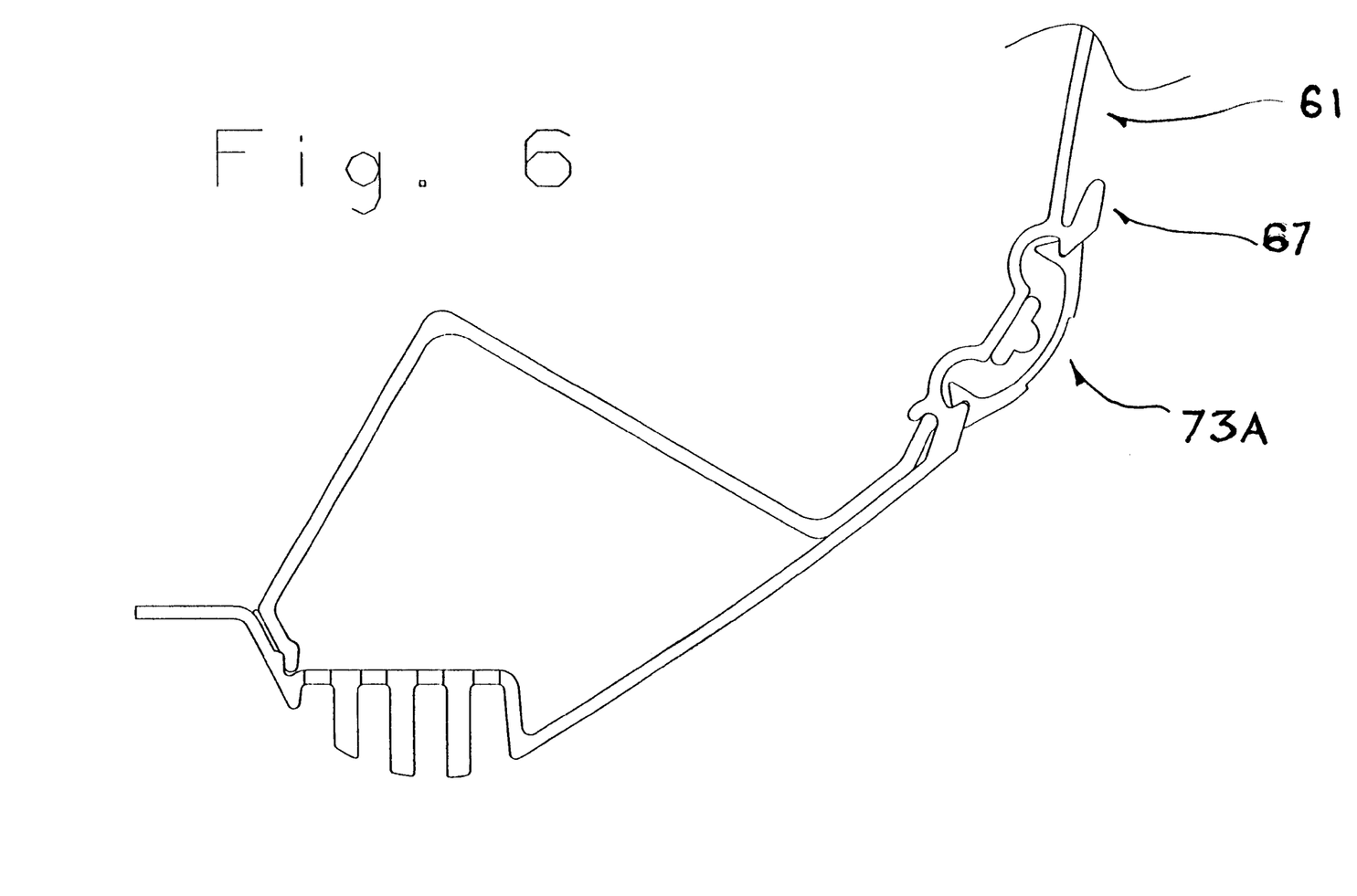
FIG. 6 is a similar vertical cross sectional view to that of FIG. 2 showing one portion only with a press switch strip at the bottom of the advertising card panel.

In FIG. 6 is shown only the area at the bottom of the panel 61 where the band 73 is modified in shape to provide a recessed central area 73A for a press switch 74 in the form of an elongate band or strip for signalling the driver. The press switch strip is commercially available from various sources and one example of a source is Tape Switch Inc.

As stated before, the lamp housing is extruded from a material such as aluminium which provides structural strength. The body 60 can be pultruded from a fibre reinforced plastics material since it does not provide a structural element communicating significant forces but instead merely needs to be self-supporting to bridge the area between the edge of the lamp housing and the flange at the top of the window. The pultruded member 60 needs to have sufficient structural strength to support the advertising card, to accommodate the vibrations of the vehicle and to accommodate the compression forces by a passenger pressing on the switch element 74. Pultrusion is a well known system for manufacturing parts of continuous cross section. The lamp housing 27 and the member 60 can be formed thus in continuous lengths and cut to the required length which can be a single portion extending along the full length of the vehicle or could be formed into shorter sections for easier handling both in installation and in co-operation with the lamp sections which are generally four feet in length. The sections can be joined by suitable strip connectors to prevent the appearance of raw edges.

The vehicle is of the type including a suspended ceiling panel 88 which covers an air duct and any other utilities supplied in this area. As shown in FIG. 2, the suspended ceiling panel 88 has an upturned edge connection portion 89 and a down turned flange 90 which attaches over the lip 54.

The lamp housing is covered by a lens/cover 93 which is formed from a clear extruded thermoplastics material. The structure of the cover is best shown in FIG. 3 and includes a hinge section 94 arranged at the outer edge of the lamp housing. The hinge section 94 defines a part cylindrical hinge member 95 which has an inner cylindrical surface co-operating with an outer cylindrical surface 96 of the lip 64. Thus the hinge section 94 co-operates with the portions of the upper end 62 of the panel 61 to allow rotation about an axis along the center of the hinge section 94 thus causing the cover to open for access to the interior for service. The lens is divided into lengths approximately equal to that of the tubes so as to access each tube individually for service. Between the hinge section 94 and the main body of the lens is provided an inverted U-shaped portion 96A which projects upwardly from the edge of the hinge toward the edge of the reflector so as to avoid the appearance of an unsightly gap.

At the inner side, the cover 93 includes an upturned flange portion 97 which co-operates with the flange portion 56 and is attached thereto by a plurality of spaced fasteners 98. These fasteners press the inner edge of a bottom panel 99 of the lens cover 93 against the horizontal bottom portion of the flange portion 55 to hold the lens cover firmly in place.

The lens cover includes the substantially horizontal flat bottom panel 99, an upwardly and outwardly inclined section 100 and two fins 101 and 102 on the upper surface extending upwardly from and generally at right angles to the upper surface. The fins are spaced one on each side of the tube. The fin 101 is relatively short and does not project upwardly to the height of the tube. The fin 102 is higher so that its top edge is above that of the fin 101 and is approximately at the level of the axis 32.

The lens cover includes a film 99A applied on the inside surface of the lens which has reflective portions 103 and 104 arranged on the inside surface of the fins 101 and 102, that is the surface facing the tube. The reflective portions 103 and 104 also extend from the respective fin onto a portion of the bottom wall 99 so that each reflective portion terminates at an inner edge 99B, 99C respectively. The film also provides an area 105 between the edges 99B and 99C and aligned with the tubes so that light from the tubes can pass through the area. The film in the area 105 is perforated or otherwise translucent so as to act to diffuse the light. Outside the fins, the lens is transparent so as to allow the light to pass directly through without diffusion.

Figure 5:
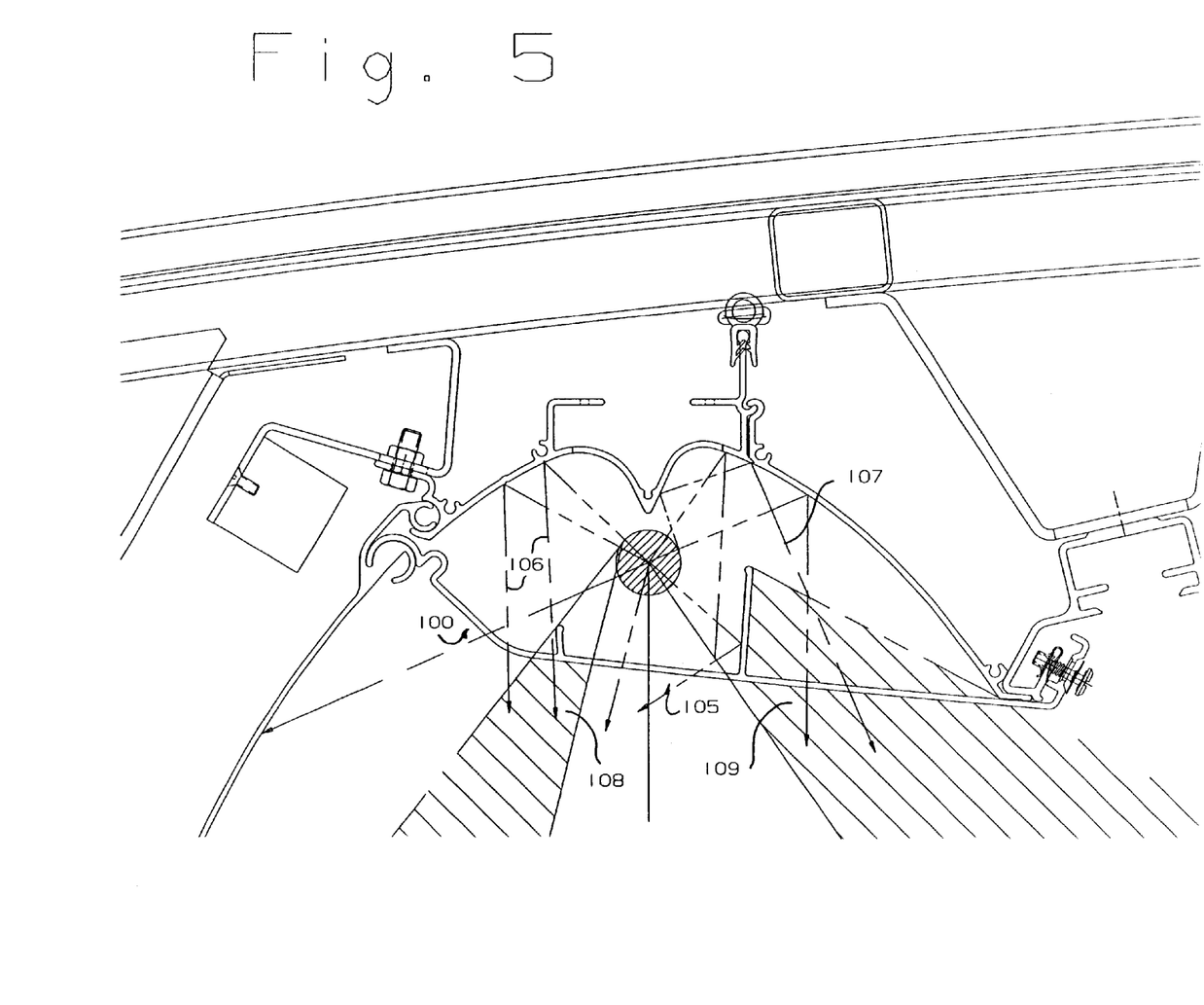
FIG. 5 is a similar vertical cross sectional view to that of FIG. 3 showing the light rays.

The light patterns from the tube are shown in FIG. 5. The fact that the tube is mounted at the center of the parabola of the mainly parabolic reflector ensures that light moving from the tube toward the reflector is reflected downwardly in parallel paths indicated generally at 106. However at the center of the reflector above the tube, the splitter defined by the V-shaped section causes the light to be reflected outwardly away from the tube and onto a further portion of the reflector to be reflected generally downwardly as indicated by one example beam 107. Thus some light beams are emitted generally downwardly and outwardly directly from the tube, some light beams move onto the parabolic part of the reflector and thus are reflected directly downwardly and some light beams are reflected by the beam splitter and thus pass downwardly and outwardly from the lens after one or more reflections.

As the fins extend generally upwardly at right angles to the bottom panel 99, the light from the tube or the reflector which is moving vertically downwardly can pass downwardly past the fins with little of the reflected light being intercepted by the reflective strips on the fins and on the bottom wall adjacent the fins. There is however a restriction to the light which passes directly from the tube onto each of the fins. That light is reflected back by the reflective strip so that a reduced amount of light passes from the axis of the tube toward the window and from the axis of the tube toward the aisle. These areas of restricted light are indicated at 108 and 109. The reduction of light directed to the aisle reduces the glare to the passenger standing in the aisle and reduces light falling directly on the opposite window. This reduction in light emitted in these areas caused by the reflections thus increases the proportion of light emitted to the passenger sitting in the seat. The reduction of light to the windows reduces reflection from the window which can interfere with the passenger viewing through the window at night-time.

The transparent inclined section 100 allows the light directly from the tube to fall onto the advertising card on the panel 61 for effective illumination thereof.

An alternative technique for assisting in the direction of the light through the lens can be used in replacement for the fins or in addition to the fins so that light is primarily transmitted at right angles to the lens and the amount of light transmitted in the areas directed to the window and the aisle is reduced. This technique utilizes a product sold under the trademark LUMISTY, which trademark is the property of Sumitomo Chemical Co. Ltd. of Japan. This product is disclosed in a brochure supplied by Madico of Woburn Mass. This product is believed to be described in U.S. Pat. No. 5,108,857 of Sumitomo Chemical Company entitled "Light Control Sheets". The product comprises a sheet of plastics film which is applied onto one surface of the lens and acts to control the light passing through the lens. The sheet allows light which is incident upon the sheet at an angle approximately at right angles to the lens to pass in a straight line through the lens and through the sheet. Light that is incident at an angle to either side of the normal is scattered. The brochure provides three grades of the sheet material wherein the angle beyond the 15° from normal causes the light to be scattered.

The sheet is thus applied to the interior surface of the extruded polycarbonate lens and extends from the reveal adjacent the part cylindrical hinge inwardly to the upturned end of the extruded lens which engages the stanchion channel. Its function is to orient the rays of light emanating directly from the tube vertically, prevent passengers from seeing the bulb from an angle, reduce the amount of light dispersed towards the windows and aisle, reduce the amount and harshness of the light generally emanating from the tube and to further orient light rays from the parabolic bulb reflector in a vertical stream. The covering further limits observation of the reflector and the socket and the socket support elements within the lighting channel.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. In a transit vehicle having a roof defining an interior ceiling surface, two side walls each extending longitudinally of the body including an upper side wall portion connecting to the roof and a row of windows underneath the upper side wall portion, an aisle and a row of seats on one side of the aisle and along the side wall at the windows, a lighting fixture comprising:

an elongate light housing supported in the vehicle along the ceiling surface longitudinally of the body at a position above the row of seats;

elongate light emitting elements mounted in the light housing and extending longitudinally of the housing;

a covering lens mounted on the light housing underneath the light emitting elements for enclosing the light emitting elements, wherein the light housing comprises a reflector surface including a main body portion having a parabolic cross-section with a parabola axis extending along the housing above the light emitting elements;

wherein the light emitting elements have an axis thereof located substantially at the parabola axis such that light emitted thereby toward the main body portion of the reflector surface is reflected downwardly through the lens; and wherein the lens has first portions thereof which allow passage of the light therethrough and second portions thereof which are reflective to restrict passage of light therethrough to increase the amount of light passing through the first portions.

2. A vehicle according to claim 1 including an elongate advertising card support panel member at a position above said one of the rows of seats and having an upper edge adjacent to the light housing and inclined therefrom downwardly and toward an upper edge of the row of windows.

3. A vehicle according to claim 2 wherein the lens includes a generally flat substantially horizontal main body portion and an inclined portion which is inclined upwardly and outwardly along one edge adjacent the support panel for allowing light to fall onto the support panel.

4. A vehicle according to claim 1 wherein the lens includes an integrally molded cylindrical hinge portion along one longitudinal edge, the hinge portion being received in a cylindrical receptacle for rotation therein.

5. A vehicle according to claim 4 wherein an opposed longitudinal edge includes an upturned flange portion fastened to a flange portion of the housing by a plurality of spaced fasteners.

6. A vehicle according to claim 1 wherein the housing comprises a substantially longitudinally continuous channel defining the reflector for a plurality of the lighting elements, wherein each lighting element comprises a tube having electrical connectors at each end, wherein between each tube and the next is provided a web member having two sides lying in a plane at right angles to the axis and having an inner edge at right angles to the sides abutting a lower surface of the housing and an outer edge at right angles to the sides abutting an upper surface of the cover.

7. A vehicle according to claim 6 wherein the cover is divided into separate portions each having a length corresponding to that of a respective one of the tubes and the cover members have end portions thereof with the upper surface of the end portions lying in contact with the outer edge of respective ones of the web members.

8. A vehicle according to claim 1 wherein the reflector includes a V-shaped portion extending longitudinally thereof substantially at a center thereof above the light elements with an apex of the V-shaped portion projecting downwardly toward the element and two sides of the V-shaped portion diverging outwardly and connecting with the main body portion.

9. A vehicle according to claim 8 wherein the sides merge contiguously with the main body portion.

10. In a transit vehicle having a roof defining an interior ceiling surface, two side walls each extending longitudinally of the body including an upper side wall portion connecting to the roof and a row of windows underneath the upper side wall portion, an aisle and a row of seats on one side of the aisle and along the side wall at the windows, a lighting fixture comprising:

an elongate light housing supported in the vehicle along the ceiling surface longitudinally of the body at a position above the row of seats;

elongate light emitting elements mounted in the light housing and extending longitudinally of the housing;

a covering lens mounted on the light housing underneath the light emitting elements for enclosing the light emitting elements;

wherein the light housing comprises a reflector surface including a main body portion having a parabolic cross-section with a parabola axis extending along the housing above the light emitting elements;

wherein the light emitting elements have an axis thereof located substantially at the parabola axis such that light emitted thereby toward the main body portion of the reflector surface is reflected downwardly through the lens; and wherein the second portions of the lens extend longitudinally of the lens and are arranged to restrict the passage of light directly from the light emitting elements toward the window and toward the aisle.

11. A vehicle according to claim 10 wherein the lens carries at least one upwardly projecting longitudinally extending fin on which is provided a reflective portion of the lens.

12. A vehicle according to claim 10 wherein the lens comprises a substantially horizontal portion which carries on an upper surface thereof two upwardly projecting longitudinally extending fins each on a respective side of the light emitting elements on each of which is provided a reflective portion of the lens and each of which is located between the light emitting elements and a respective one of the window and the aisle, the horizontal portion of the lens on either side of the fins and between the fins being arranged to allow the passage of reflected light from the reflector.

13. A vehicle according to claim 12 wherein one of the fins lying on the side adjacent the aisle is higher than that adjacent the window.

14. A vehicle according to claim 12 wherein the reflective portion extends from the respective fin partly onto the main body portion.

15. In a transit vehicle having a roof defining an interior ceiling surface, two side walls each extending longitudinally of the body including an upper side wall portion connecting to the roof and a row of windows underneath the upper side wall portion, an aisle and a row of seats on one side of the aisle and along the side wall at the windows, a lighting fixture comprising:

an elongate light housing supported in the vehicle along the ceiling surface longitudinally of the body at a position above the row of seats;

elongate light emitting elements mounted in the light housing and extending longitudinally of the housing;

a covering lens mounted on the light housing underneath the light emitting elements for enclosing the light emitting elements;

wherein the light housing comprises a reflector surface including a main body portion having a parabolic cross-section with a parabola axis extending along the housing above the light emitting elements;

wherein the light emitting elements have an axis thereof located substantially at the parabola axis such that light emitted thereby toward the main body portion of the reflector surface is reflected downwardly through the lens;

wherein the reflector includes a V-shaped portion extending longitudinally thereof substantially at a center thereof above the light elements with an apex of the V-shaped portion projecting downwardly toward the element and two sides of the V-shaped portion diverging outwardly and connecting with the main body portion;

wherein the sides merge contiguously with the main body portion; and wherein the reflector is non-conductive and the V-shaped portion carries at the apex a ground wire for the lighting element.

16. A transit vehicle comprising:
a vehicle body having a roof defining an interior ceiling surface, a side wall extending longitudinally of the vehicle including an upper side wall portion connecting to the roof and a row of windows underneath the upper portion, an aisle and a row of seats along the side wall between the aisle and the side wall; and
a lighting fixture comprising:
an elongate light housing supported in the vehicle along the ceiling surface longitudinally of the vehicle at a position above the row of seats;
elongate light emitting elements mounted in the light housing and extending longitudinally of the housing; and
a covering lens mounted on the light housing underneath the light emitting elements for enclosing the light emitting elements;
wherein the light housing defines a reflector surface which has a main body portion;
wherein the housing comprises a substantially longitudinally continuous channel defining the reflector for a plurality of the lighting elements;
wherein each lighting element comprises a tube having electrical connectors at each end; and
wherein between each tube and the next is provided a web member having two sides lying in a plane transverse to the housing and having an upper edge abutting a lower surface of the housing and an lower edge abutting an upper surface of the cover.

17. A vehicle according to claim 16 wherein the lens is divided into plural lens portions, each having a length corresponding to that of a respective one of the tubes and the lens portions have end portions with upper surfaces in contact with the lower edges of respective ones of the web members.

18. A transit vehicle comprising;
a vehicle body having a roof defining an interior ceiling surface, a side wall extending longitudinally of the vehicle including an upper side wall portion connecting to the roof and a row of windows underneath the upper portion, an aisle and a row of seats along the side wall between the side wall and the aisle; and
a lighting fixture comprising:
an elongate light housing supported in the vehicle alone the ceiling surface longitudinally of the vehicle at a position above the row of seats;
elongate light emitting elements mounted in the light housing and extending longitudinally of the housing; and
a covering lens mounted on the light housing underneath the light emitting elements for enclosing the light emitting elements;
wherein the light housing defines an elongate reflector surface which has a main body portion;
wherein the reflector surface includes a V-shaped portion extending along the reflector surface substantially at a center thereof above the light elements with an apex of the V-shaped portion projecting downwardly toward the element and two sides of the V-shaped portion diverging outwardly and connecting with the main body portion; and
wherein the housing is non-conductive and carries a ground wire for the lighting element along the housing adjacent the apex of the V-shaped portion.

19. A vehicle according to claim 18 therein the main body portion has a parabolic cross-section with a parabola axis extending along the housing above the light emitting elements and wherein the light emitting elements have an axis thereof located substantially at the parabola axis such that light emitted thereby toward the main body of the reflector surface is reflected downwardly through the lens and wherein the sides of the V-shaped portion merge into the main body portion.

20. In a transit vehicle having a roof defining an interior ceiling surface, two side walls each extending longitudinally of the body including an upper side wall portion connecting to the roof and a row of windows underneath the upper side wall portion, an aisle and a row of seats on one side of the aisle and along the side wall at the windows, a lighting fixture comprising;
an elongate light housing supported in the vehicle along the ceiling surface longitudinally of the body at a position above the row of seats;
elongate light emitting elements mounted in the light housing and extending longitudinally of the housing;
a covering lens mounted on the light housing underneath the light emitting elements for enclosing the light emitting elements;
wherein the light housing comprises a reflector surface including a main body portion hating a parabolic cross-section with a parabola axis extending along the housing above the light emitting elements;
wherein the light emitting elements have an axis thereof located substantially at the parabola axis such that light emitted thereby toward the main body portion of the reflector surface is reflected downwardly through the lens; and
wherein the covering lens carries a light control sheet operable to allow passage of light approximately normal to the lens to pass directly thorough the lens and to cause light incident at an angle beyond a certain angle to be scattered.

* * * * *